US006872010B1

United States Patent
Bianchini

(10) Patent No.: US 6,872,010 B1
(45) Date of Patent: Mar. 29, 2005

(54) FIBER OPTIC CONNECTOR RELEASE MECHANISM

(75) Inventor: Gioni Bianchini, Sunol, CA (US)

(73) Assignee: Fourte Design & Development, LLC, Sunol, CA (US)

( * ) Notice: Subject to any disclaimer, the term of this patent is extended or adjusted under 35 U.S.C. 154(b) by 0 days.

(21) Appl. No.: 10/454,643

(22) Filed: Jun. 3, 2003

(51) Int. Cl.$^7$ ................................................ G02B 6/36
(52) U.S. Cl. .............................. 385/92; 385/88; 385/53
(58) Field of Search ............................. 385/53, 88, 89, 385/92

(56) References Cited

U.S. PATENT DOCUMENTS

| | | | |
|---|---|---|---|
| 6,746,158 B2 * | 6/2004 | Merrick ........................ | 385/53 |
| 6,789,958 B2 * | 9/2004 | Ahrens et al. ................. | 385/92 |
| 2003/0108300 A1 * | 6/2003 | Walker et al. ................. | 385/53 |
| 2004/0033027 A1 * | 2/2004 | Pang et al. .................... | 385/53 |

* cited by examiner

Primary Examiner—Juliana K. Kang
(74) Attorney, Agent, or Firm—The Kline Law Firm

(57) ABSTRACT

A fiber optic connector release mechanism that is used on a transceiver module housed in a cage assembly permanently mounted on a printed circuit board. The release mechanism comprises a sliding handle operated by a cam mounted bail. The cam mounted bail has a two stage travel path. When the bail is released from its locked position, it rotates through the first stage of the cam slot through an arc of approximately 45°. As the bail rotates past 45° in the second stage of the cam slot, the cooperation of a first axis pin mounted in the cam slot and a second axis pin mounted in a straight second slot in the handle urges the handle forward in a slide path on the transceiver module. As the handle begins to move forward, wedge elements at the ends of a pair of slide arms extending rearward from the handle contact locking tabs on the cage assembly. As the handle slides forward in the slide path, the wedge elements force the locking tabs outward. As the locking tabs are forced outward, the shoulders of the transceiver module are released, and the transceiver module is free to slide out of the cage assembly as the operator pulls on the handle.

12 Claims, 4 Drawing Sheets

FIBER OPTIC CONNECTOR RELEASE MECHANISM

BACKGROUND OF THE INVENTION

1. Field of the Invention

The present invention relates generally to electronic connector devices, and more particularly is a fiber optic connector release mechanism.

2. Description of the Prior Art

Computers and related peripheral equipment, and satellite and communication systems, have in the recent past evolved extremely rapidly. These systems require ever increasing data transfer rates to perform the highly complex tasks that drive the systems, such as digital signal processing, image analysis, and communications. With current demands, optical couplers are used to transfer signals over short and long distances between computers, between two circuit boards in one computer, and even between multiple chips on a single printed circuit board. The use of high speed optical signals in place of electrical interconnections increases the achievable data transfer rate.

An optical transmitter/receiver module typically includes both light emitting devices such as vertical cavity surface emitting lasers (VCSEL's) and light detecting devices such as photodiodes. Driver/receiver circuitry modules, typically in the form of application specific integrated circuit (ASIC) chips, include driver circuitry which receives electrical signals from one device and drives the VCSEL's in response. The ASIC also includes receiver circuitry for receiving signals from the photodiodes and, in response, for processing those signals into an appropriate output. The combination of the VCSEL's, the photodiodes, and the ASIC circuitry is commonly referred to as an optical transceiver.

As the density of the optical arrays increases, coupling a fiber optic cable to the arrays becomes an increasingly complex task. It is very important to align the active area of each emitter and detector with a corresponding fiber of the fiber optic bundle. The mechanical connection means therefore undergo a corresponding increase in importance. Fiber optic connectors are therefore of great interest in the current art. As such, improvements are always welcome in the reliability and ease of manufacturing of such connectors.

In the applications which are the subject of the present invention, a pair of type LC plugs are received in a pair of bays in a fiber optic transceiver module housed in a cage assembly that is permanently mounted to a PCB. It is imperative for data integrity that the connector means hold the LC plugs in position during data transmission or receiving. If the user wants to remove the transceiver module from the cage, it is equally important that he be able to know whether or not the LC plugs are in use.

Accordingly, it is an object of the present invention to provide a connector with a release handle formed with a one piece construction for superior rigidity and release stability.

It is another object of the present invention to provide a release mechanism that is very simple to manufacture.

It is still another object of the present invention to provide a foolproof positive check on inadvertent removal of the transceiver module while the LC plugs are still in place.

SUMMARY OF THE INVENTION

The present invention is a fiber optic connector release mechanism. The release mechanism is used on a transceiver module housed in a cage assembly that is permanently mounted on a printed circuit board. The release mechanism comprises a sliding handle operated by a cam mounted bail. The cam mounted bail has a two stage travel path. When the bail is released from its locked position, it rotates through the first stage of the cam slot through an arc of approximately 45°. The bail cannot complete this first arc unless the LC plugs have been removed from the transceiver module.

As the bail rotates past 45° in the second stage of the cam slot, the cooperation of a first axis pin mounted in the cam slot and a second axis pin mounted in a straight second slot in the handle urges the handle forward in a slide path on the transceiver module. As the handle begins to move forward, wedge elements at the ends of a pair of slide arms extending rearward from the handle contact locking tabs on the cage assembly that are secured against shoulders of a locking tab receiving opening on the transceiver module body. As the handle slides forward in the slide path, the wedge elements force the locking tabs outward. As the locking tabs are forced outward, the shoulders of the transceiver module are released, and the transceiver module is free to slide out of the cage assembly as the operator pulls on the handle.

An advantage of the present invention is that the one piece construction of the handle provides greater stability than is available from prior art multiple piece handle constructions.

Another advantage of the present invention is that it provides a safeguard against premature removal of the transceiver module.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
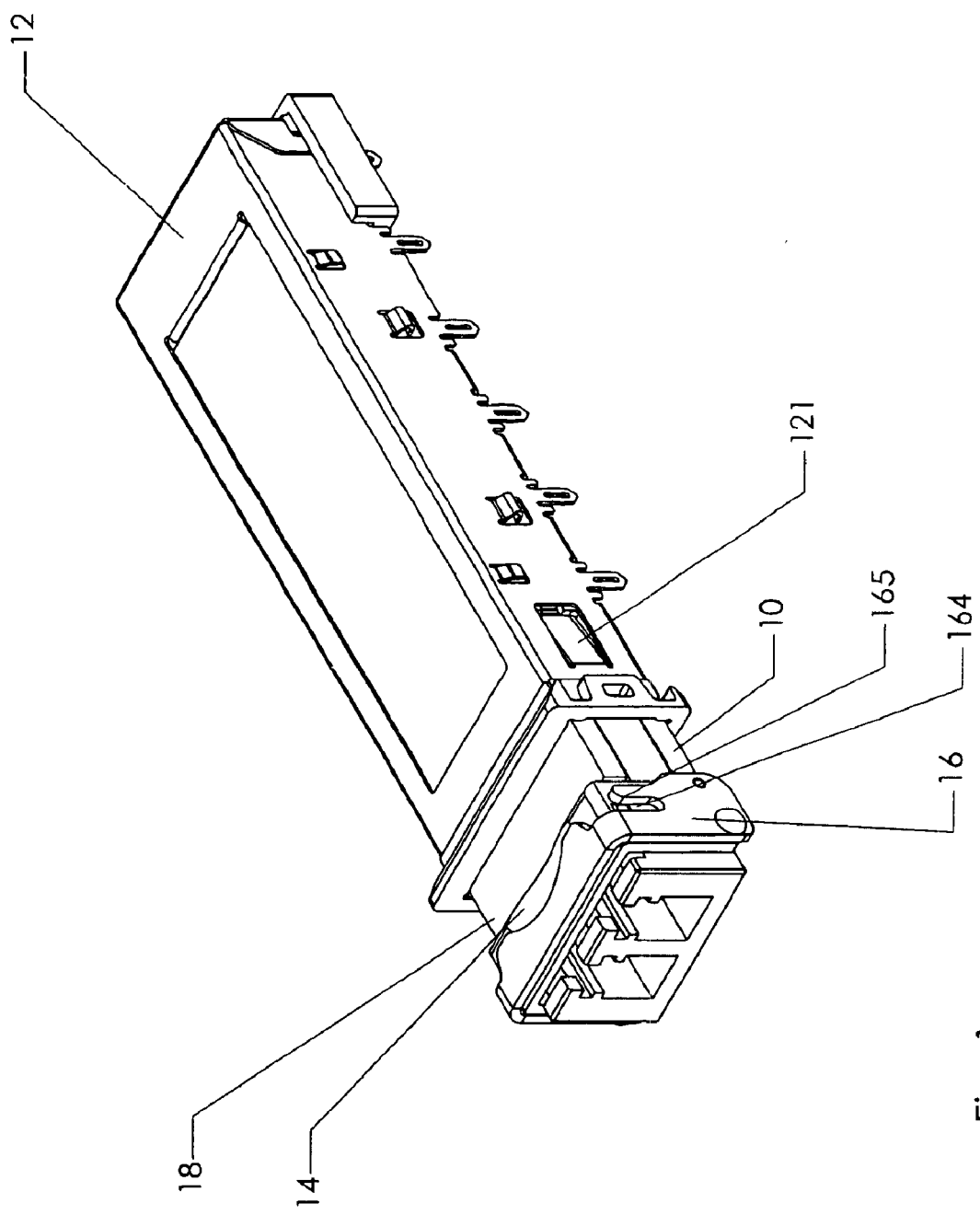
FIG. 1 is a perspective view of a transceiver module with a release mechanism according to the present invention installed in a cage assembly.

The present invention is a fiber optic connector release mechanism as illustrated in FIGS. 1–4. The release mechanism is used on a transceiver module 10 housed in a cage assembly 12 that is typically permanently mounted on a printed circuit board. The release mechanism comprises a sliding handle 14 operated by a cam mounted bail 16. The transceiver module 10 is held in place in the cage 12 by a pair of locking tabs 121 protruding inward from the sides of the cage 12. The locking tabs 121 are received in slide paths 101 formed in sides of the transceiver module housing 102. As the transceiver module 10 is inserted into the cage 12, a flat segment 103 of the transceiver module housing 102 depresses the locking tabs 121. When the transceiver module 10 is in the proper position in the cage assembly 12, the locking tabs 121 rebound into the slide paths 101 on each side of the module housing 103, where they abut shoulders 104 at the ends of the slide paths 101. The transceiver module 10 therefore cannot be removed from the cage assembly 12 with the locking tabs 121 in place.

Figure 2:
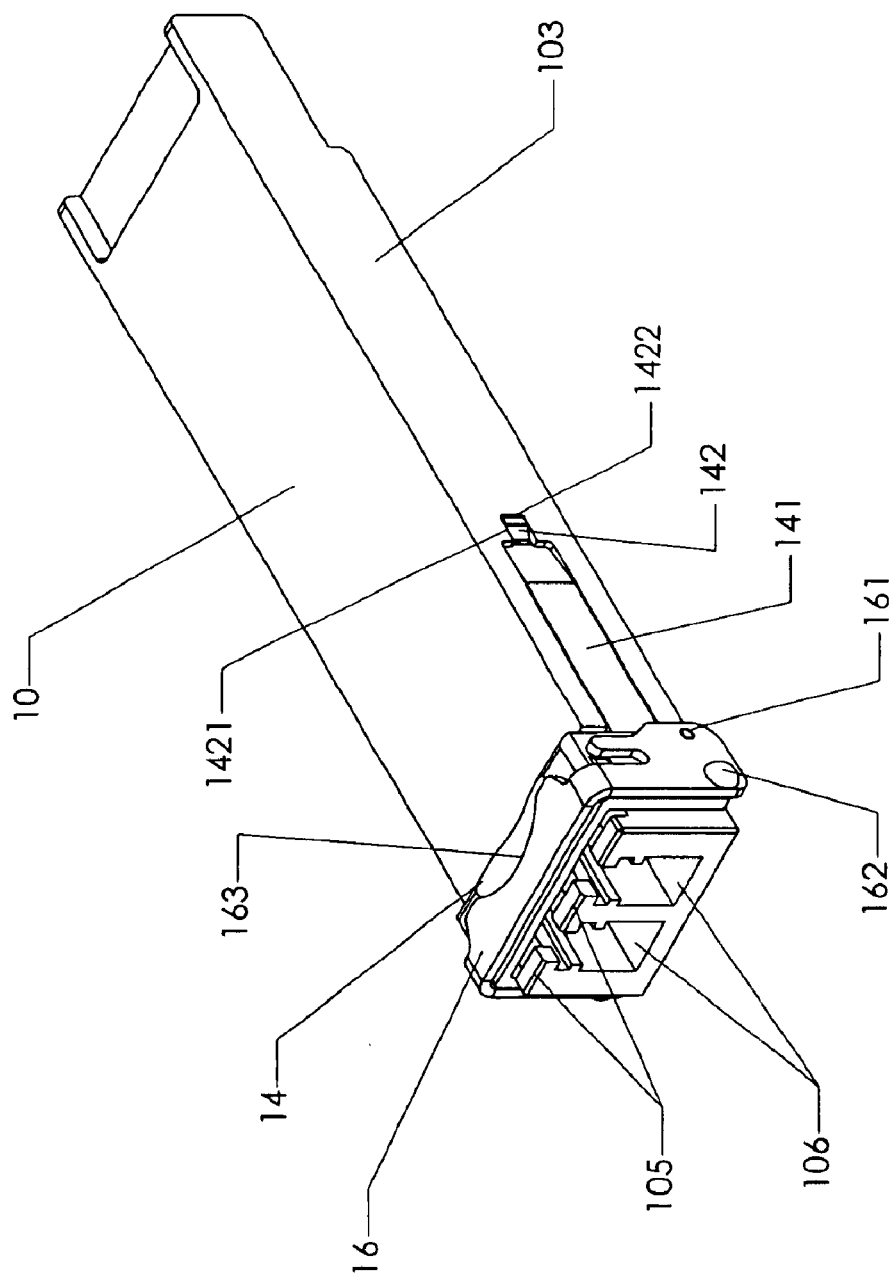
FIG. 2 is a perspective view of the transceiver module removed from the cage assembly, and with the bail and handle in their locked positions.
Figure 3:
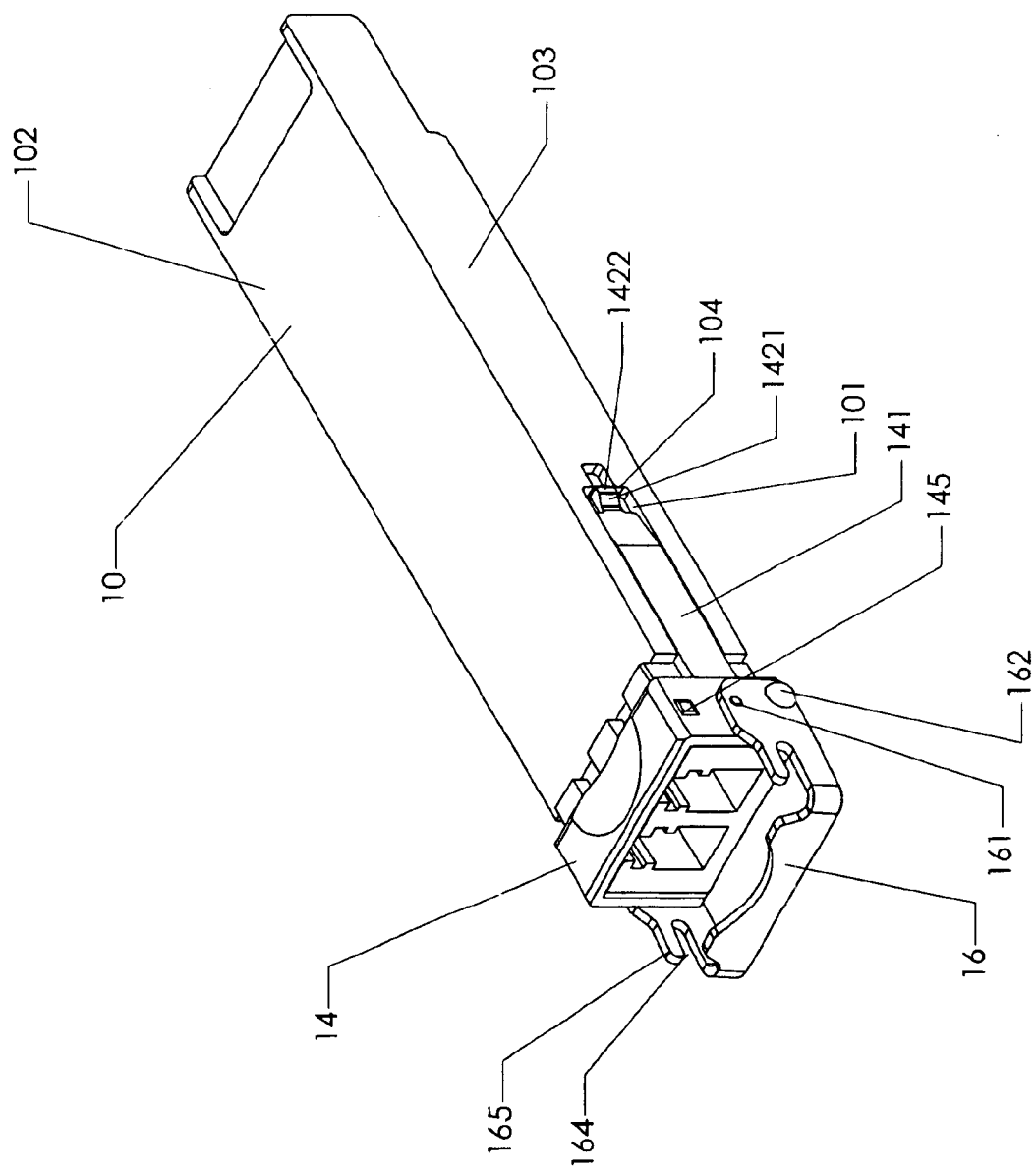
FIG. 3 is a perspective view of the transceiver module with the bail and handle in their released positions.
Figure 4:
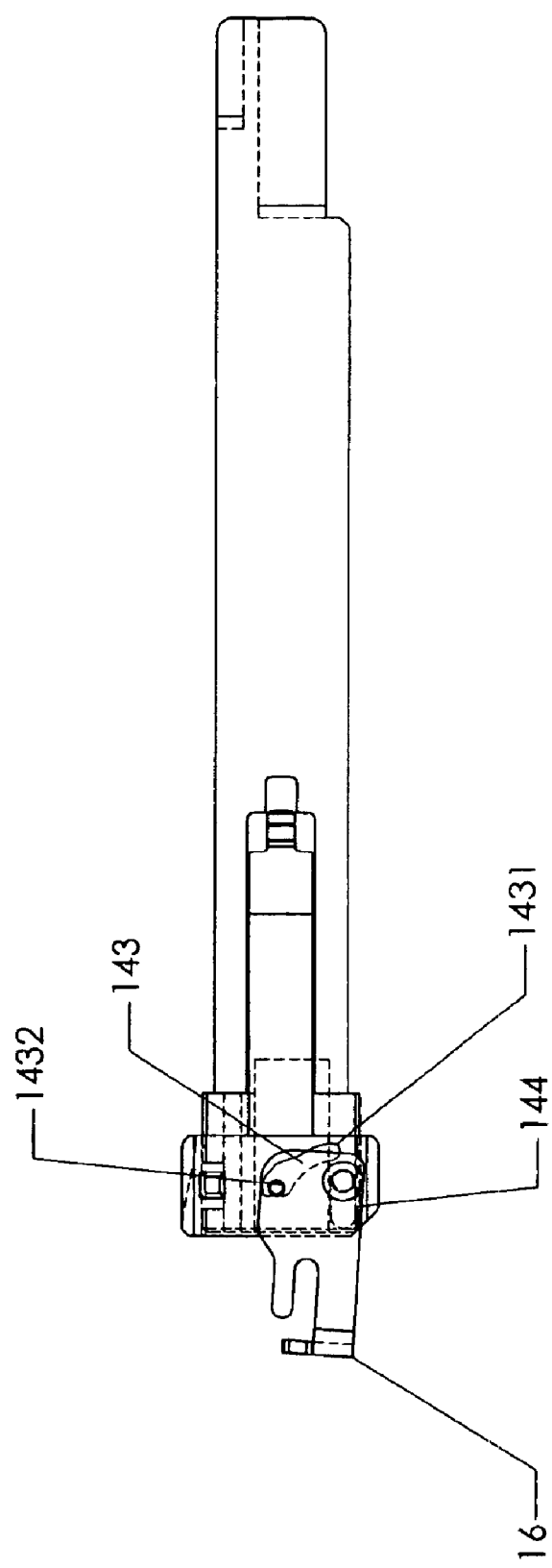
FIG. 4 is a side view of the transceiver module with the bail and handle in their released positions.

The handle 14 is mounted on the module housing 103 by means of extended arms 141 that are received in the slide paths 101. The handle 14 is positioned behind abutments 105 above a pair of LC plug bays 106. The abutments 105 define the forward limitation of the slide of the handle 14 relative to the module housing 103. When the bail 16 and the handle 14 are in their fully locked position, as shown in FIGS. 1 and 2, there is a gap 18 between the rear edge of abutments 105 and the front edge of the handle 14.

At the rear ends of the arms 141 are wedge elements 142 that each include an angled or arced surface 1421 that allows the wedge elements 142 to raise the locking tabs 121 when the release mechanism is actuated. The locking tabs 121 rest on plateau sections 1422 of the wedge elements after the locking tabs 121 have been pressed outward.

The actuating device of the release mechanism is the bail 16. The bail 16 is mounted on the handle 14 by a first axis pin 161 received in an eccentric cam slot 143 in the handle 14 and a second axis pin 162 received in a straight second slot 144. The top side of the bail 16 includes a conveniently shaped finger plate 163 that provides a means for a user to easily grasp the bail 16. Tabs 165 that extend from a rear portion of the bail 16 define slots 164 that receive tapered bosses 145 of the handle 14 so as to secure the bail 16 when it is in the locked position shown in FIGS. 1 and 2.

The dual rotational axes of the bail 16 provides the bail 16 with a two stage travel path. When the projections 164 of the bail 16 are removed from the detents 145 to release the bail 16 from its locked position, the first axis pin 161 moves through a first stage 1431 of the cam slot 143 as the bail rotates through an arc of approximately 45°. It should be noted that the bail 16 cannot complete this first arc unless the LC plugs have been removed from the plug bays 106 of the transceiver module 10. This feature provides a failsafe method for assuring that the transceiver module 10 cannot be removed from the cage assembly 12 while the LC plugs are in position, thereby avoiding inadvertent data transmission interruption.

As the bail 16 rotates past 45° with the first axis pin 161 moving into the second stage 1432 of the cam slot 143, the cooperation of the first axis pin 161 mounted in the cam slot 143 and the second axis pin 162 mounted in the second slot 144 urges the handle 14 forward in the slide paths 101 on the transceiver module 10. As the handle arms 141 begin to move forward, the angled surfaces 1421 of the wedge elements 142 press against the locking tabs 121 on the cage assembly 12, moving the tabs 121 out of the slide paths 101. When the arms 14 move forward far enough so that the plateau sections 1422 are behind the locking tabs 101, the locking tabs 101 will have been moved clear of the shoulders 104 of the transceiver module 10, so that the transceiver module 10 is free to slide out of the cage assembly 12 as the operator continues to pull on the handle 14. The handle 14 is now in the released position shown in FIGS. 3 and 4, with the handle 14 contacting abutments 105 of the transceiver module 10.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A fiber optic connector release mechanism in combination with a transceiver module housed in a cage assembly comprising:

a sliding handle and a rotating bail, said bail is mounted on said handle by a first axis pin received in an eccentric cam slot in said handle, and a second axis pin received in a straight second slot in said handle; wherein said transceiver module is held in place in said cage assembly by at least one locking tab protruding inward from a side of said cage assembly, said locking tab being received in a slide path formed in a side of a transceiver module housing, and said handle comprises a pair of arms received in said slide path, said arms having at distal ends thereof a wedge element; such that when said release mechanism is in a locked position, said handle is in a rearmost position in said slide path, and said at least one locking tab protrudes into said slide path so as to secure said transceiver module, and when said bail is rotated to a released position, said handle moves to a forward position in said slide path, causing said wedge elements to push against said at least one locking tab so as to move said at least one locking tab out of said slide path, thereby releasing said transceiver module from said cage assembly.

2. The release mechanism of claim 1 wherein:

said wedge elements each comprise an angled surface and a plateau section.

3. The release mechanism of claim 1 wherein:

said wedge elements each comprise an arced surface and a plateau section.

4. The release mechanism of claim 1 wherein:

said bail includes a tab projecting therefrom, said tab defining a slot that receives a boss projecting from said handle so as to secure said bail when said bail is in a locked position.

5. The release mechanism of claim 1 wherein:

said bail moves in a two stage travel path, said bail rotating from a locked position through an approximately 45° arc without moving said transceiver module from an installed position as said first axis pin moves through a first stage of said cam slot, and said bail further rotating as said first axis pin moves through a second stage of said cam slot.

6. The release mechanism of claim 1 wherein:

said transceiver module remains in an installed position as said bail moves from a locked position through an approximately 45° arc, and said bail is not able to complete said 45° arc unless plug bays of said transceiver module are not occupied by plugs.

7. A fiber optic connector release mechanism in combination with a transceiver module housed in a cage assembly comprising:

a sliding handle and a rotating bail, said bail includes a tab projecting therefrom, said tab defining a slot that receives a boss projecting from said handle so as to secure said bail when said bail is in a locked position; wherein said transceiver module is held in place in said cage assembly by at least one locking tab protruding inward from a side of said cage assembly, said locking tab being received in a slide path formed in a side of a transceiver module housing, and said handle comprises a pair of arms received in said slide path, said arms having at distal ends thereof a wedge element; such that when said release mechanism is in a locked position, said handle is in a rearmost position in said slide path, and said at least one locking tab protrudes into said slide path so as to secure said transceiver module, and when said bail is rotated to a released position, said handle moves to a forward position in said slide path, causing said wedge elements to push against said at least one locking tab so as to move said at least one locking tab out of said slide path, thereby releasing said transceiver module from said cage assembly.

8. The release mechanism of claim 7 wherein:

said wedge elements each comprise an angled surface and a plateau section.

9. The release mechanism of claim 7 wherein:

said wedge elements each comprise an arced surface and a plateau section.

10. The release mechanism of claim 7 wherein:

said bail is mounted on said handle by a first axis pin received in an eccentric cam slot in said handle, and a second axis pin received in a straight second slot in said handle.

11. The release mechanism of claim 10 wherein:

said bail moves in a two stage travel path, said bail rotating from a locked position through an approximately 45° arc without moving said transceiver from an installed position as said first axis pin moves through a first stage of said cam slot, and said bail further rotating as said first axis pin moves through a second stage of said cam slot.

12. The release mechanism of claim 7 wherein:

said transceiver module remains in an installed position as said bail moves from a locked position through an approximately 45° arc, and said bail is not able to complete said 45° arc unless plug bays of said transceiver module are not occupied by plugs.

* * * * *